Dec. 13, 1966 G. A. ROBITAILLE 3,291,919

UNATTENDED RADIO STATION

Filed Jan. 31, 1963 3 Sheets-Sheet 1

UNATTENDED RADIO STATION

Filed Jan. 31, 1963

3,291,919

UNATTENDED RADIO STATION

Glen A. Robitaille, P.O. Box 488,
London, Ontario, Canada

Filed Jan. 31, 1963, Ser. No. 255,264
9 Claims. (Cl. 179—100.2)

Figure 1:
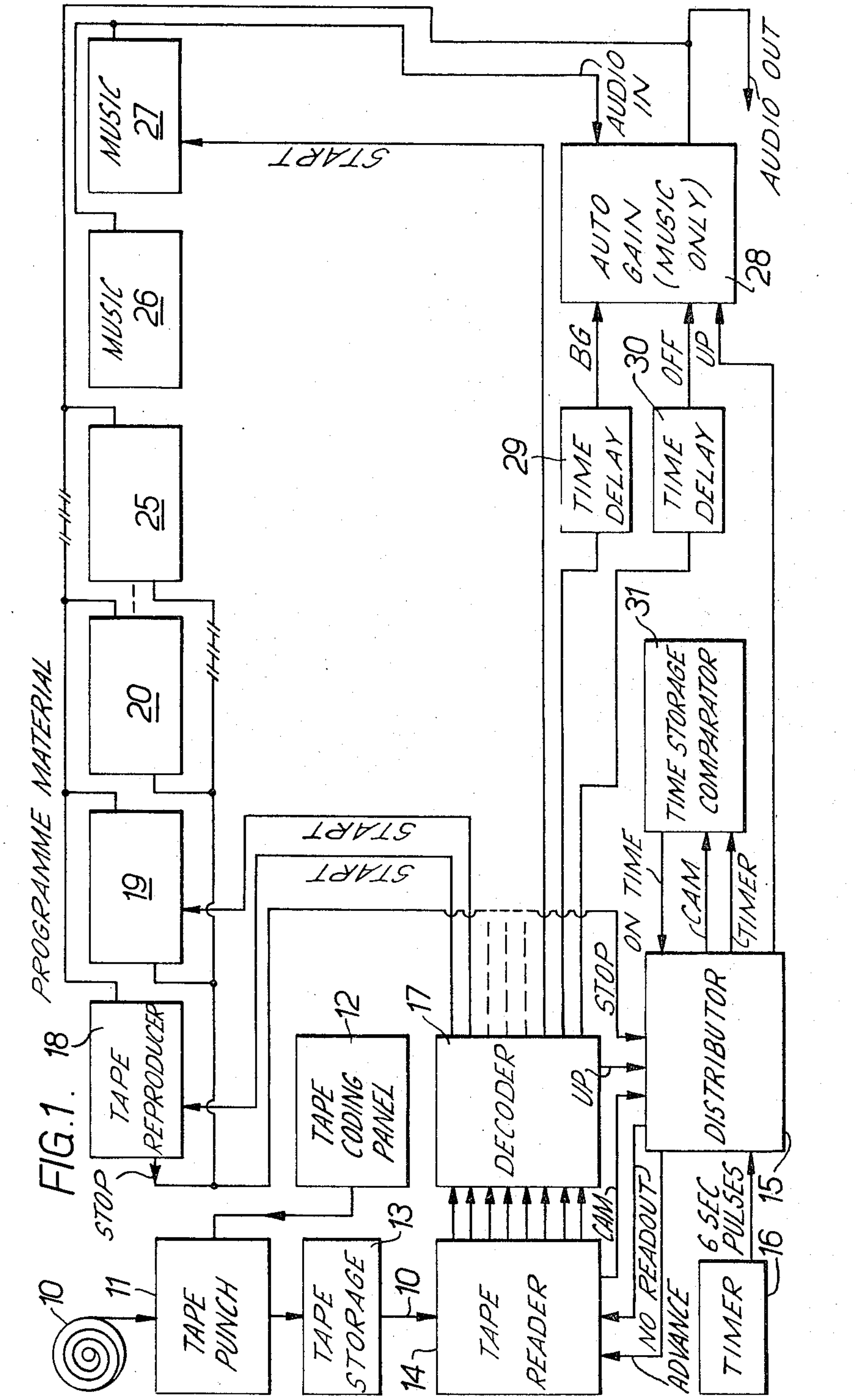

The present invention relates to a system for automatically controlling the operation of a radio station.

The operating costs of radio stations have been constantly increasing. These costs are mainly tied to the salary paid to operating personnel and are not primarily dictated by overhead. Thus, if the operating personnel of a radio station are employed only during a portion of the time that the radio station is on the air, the operating costs of the station will be reduced. This highly desirable decrease in the cost of operation may be achieved if the radio station is operated unattended during certain portions of the day.

In order to achieve unattended operation of a radio station, automatic equipment must be provided which will perform all the necessary operations to provide the normal services of a radio station during the period of unattended operation. News casts, time signals, music and commercials which form the normal programme material of a radio station must all be provided as usual. Flexibility in operation is also essential. It will be appreciated that the length of commercials and news casts in particular, is variable, depending upon the amount of time sold to sponsors. The sequence of items of programme material will also be variable; some news casts may be sponsored and others not sponsored. Accordingly, a system for the unattended operation of a radio station cannot be controlled solely by a timing device, which programmes the signals from the radio station. However, it is essential that time signals be accurately given which makes it necessary to provide some co-relation between the programme material and a timing device.

Known systems for controlling the signals transmitted by unattended radio stations are of two types. Firstly, there are systems which are controlled by a time clock or by a device operating in synchronism with a clock. Such systems lack the flexibility essential to the normal operation of a commercial radio station. Secondly, control systems are known which will arrange programme material in correct sequence but in view of variable length of different elements of programme material, such as commercials, these systems do not ensure that time checks are accurately given. The reliability of both known systems has not been high.

In contrast to these known systems, the present invention provides a system for the automatic and unattended operation of a radio station which can accommodate variable length programme elements to provide the necessary flexibility of operation and at the same time can ensure that time checks are accurately given and that programmes start and stop at the correct time. This system is also reliable in operation and may be varied to control different sources of programme material.

In modern commercial radio station operation, the programme material to be transmitted is recorded on magnetic tape and the recorded tapes are played back through suitable tape reproducers. In this way, a continuous programme of any desired length may be obtained. Frequently, different types of material are recorded on separate magnetic tapes, thus the music for a period of programming may be recorded on one tape, the news casts on a second tape, time checks on a third tape and commercials on other tapes. The present invention will be described in relation to such tape recorded sources of programme material although it will be apparent that other sources may readily be substituted. For example, music may be obtained from a record player such as the unit manufactured by the Seeburg Company, which will play both sides of one hundred 45 r.p.m. disc records. Similarly, it would be possible, although not necessarily desirable to insert live programme material such as on-the-spot newscasts and the like, during a recorded programme. With the system of the present invention, such operation is feasible.

The present invention provides a system for the unattended operation of a radio station wherein the selection of programme material from a plurality of sources of programme material is effected in response to a series of coded instructions. These coded instructions are normally scanned by a device operated in synchronism with a timer but may be scanned in such a manner that the completion of a programme element from a given source of programme material will cause the start of a programme element from a second source of programme material. Provision is made in accordance with the present invention for recording the time elapsed when the instruction record is sequentially scanned and for returning the scanning of the instruction record to a condition synchronous with the timer. In particular, provision is made for the insertion in the sequence of programme material, of programme elements whose length is not known and for the programming to return to synchronous operation on the completion of one or more sequences of such programme elements. Thus material which must be correctly timed, can be transmitted at the appropriate time and other material of indeterminate length which is not precisely timed may be transmitted without affecting the accuracy of timing of the system.

In one aspect of the present invention, the desired sequence of programme material is recorded by perforating a paper tape with coded instructions representative of the sequence of programme elements. Perforations are made in the tape representative of programme elements such as time signals or programmes which are scheduled to begin at specific time intervals, and provision is made in the system of the present invention, for inserting in the programme, elements of programme material which are of unknown length, and for recording the length of these programme elements, to return the programme to a synchronous condition after such a programme element has been broadcast.

In the system of the present invention the principal source of programme material will be recorded music and it has been found that a considerable saving in equipment complexity and operating costs may be obtained if the music is played continuously and the level of the music is varied in accordance with the requirements of the other programme elements in the broadcast. Thus for example, if a time check is to be inserted in the broadcast, it is not necessary for the music to be made completely inaudible, it is sufficient if the music be decreased in level until it forms a background for the time check and after the check has been inserted in the broadcast, the music may be returned to normal level. With other forms of programme elements it will of course, be desirable that the music be made completely inaudible and this may be done by decreasing its level to zero while permitting the reproducer from which the music is originating to continue in operation.

Figure 2:
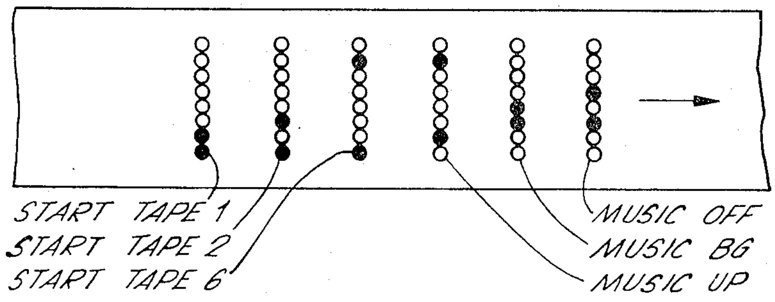
Figure 3:
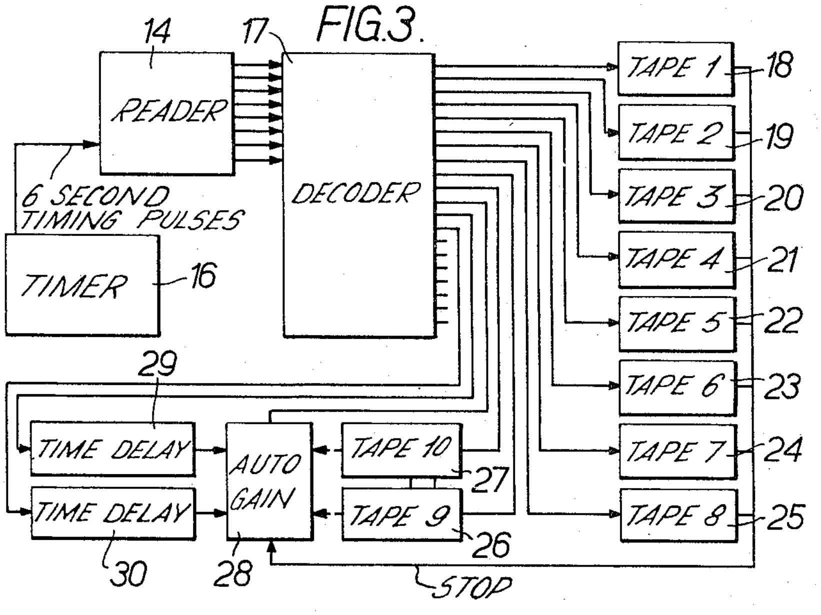
Figure 4:
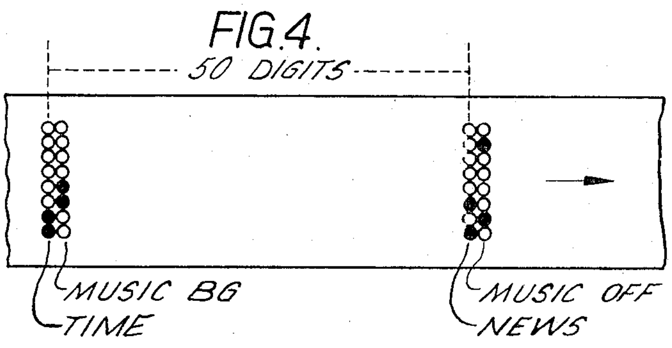
Figure 5:
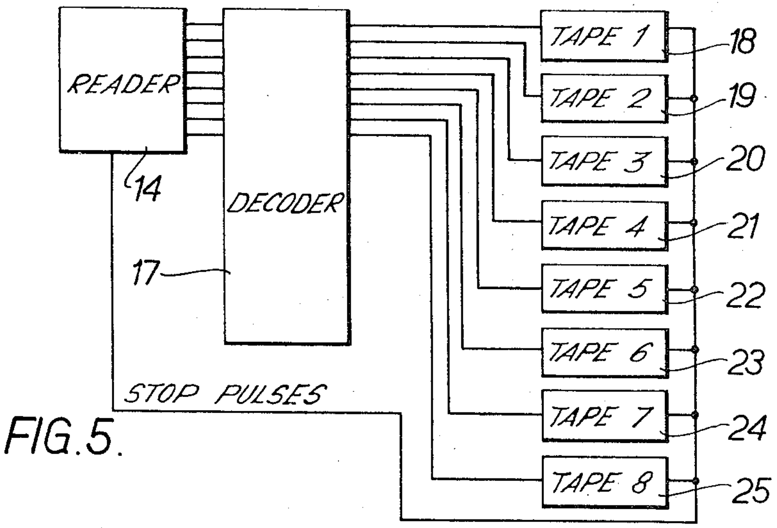
Figure 6:
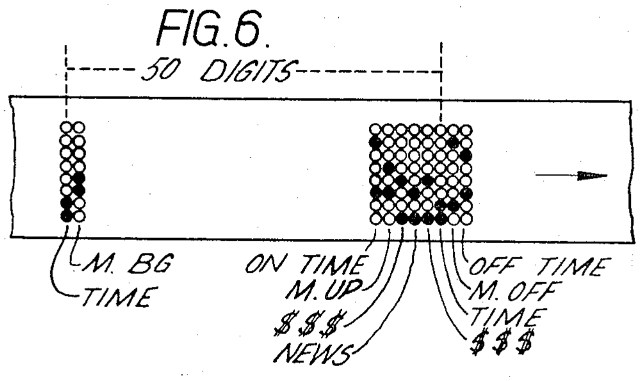
Figure 7:
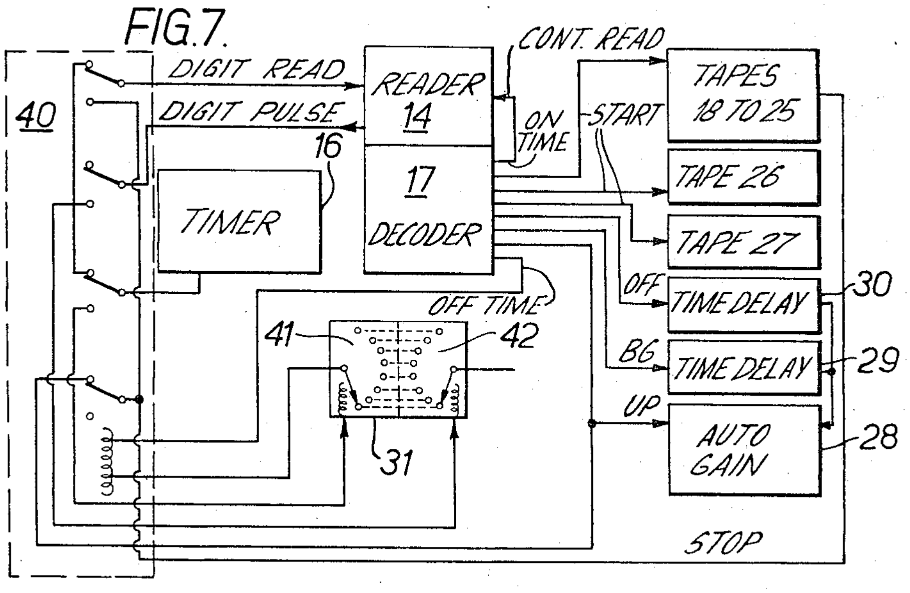

FIG. 1 is a block diagram indicating broadly the individual elements of the system of the present invention, FIG. 2 shows a portion of the paper-tape used in an embodiment of the present invention, with typical codes recorded thereon, FIG. 3 is a functional block diagram showing the equipment operating in the synchronous mode, FIG. 4 shows a sample of a paper tape coded with a typical sequence of synchronous programme elements, FIG. 5 is a functional block diagram showing the connection of equipment in the non-synchronous mode of operation, FIG. 6 is a sample of a typical sequence of non-synchronous coded programme elements, FIG. 7 is a functional block diagram showing the interconnection of the elements of the system of the present invention to enable the equipment to measure the length of and compensate for a programme element of unknown length.

A system constructed in accordance with the present invention is shown in FIG. 1. A roll of paper tape 10 is provided on which the sequence of programme elements is recorded. As shown in FIG. 2 the sequence of programme elements is recorded as a series of pairs of perforations in the paper tape. These perforations are made in the paper tape by means of the tape punch 11 (FIG. 1) operated from a tape coding panel 12. After the paper tape 10 has been perforated by the tape punch 11 in the required sequence of programme elements, these tapes may be stored in a tape storage unit 13 until required for use. When a broadcast following the code recorded on the paper tape 10 is to be made, this paper tape 10 is fed into a tape reader 14 which is controlled by signals from the distributor 15. Normally the distributor 15 will pass a timing pulse each six seconds from a timer 16, to the tape reader 14 so that a code on the tape is read and the tape advanced once every six seconds. The code recorded on the tape is fed into the decoder 17 from the tape reader 14 and is decoded into the appropriate signals for operation of the sources of programme material. As shown in FIG. 1 the sources of programme material comprise tape reproducers 18–27 inclusive, tape reproducers 21 to 24 not being shown to save space. Tape reproducers 26 and 27 contain recorded music and are arranged so that after tape reproducer 26 has reproduced the full recording contained on its magnetic tape, tape reproducer 27 will be started and reproduce its programme. With currently available tape reproducers it is possible with a pair of tape recorders to provide continuous music for any required period of time. An automatic gain control 28 is included and the audio output from the tape reproducers 26 and 27 only is fed through the automatic gain control 28 before being passed to the radio transmitter for broadcasting. The audio output from the remaining tape reproducers 18 to 25 inclusive is directed to the radio transmitter without being passed through the automatic gain control 28.

Two time delay devices 29 and 30 are provided between the decoder and the automatic gain control and a time storage comparator 31 is also provided. The function and operation of these units will become more apparent from the description which follows.

The flow of control signals and program information is indicated by the connecting lines used between the blocks of the circuit diagram and by the arrows placed on these connecting lines. Coded information from the tape reader 14 is passed to the decoder 17 and from the decoder 17 to the tape reproducers 18 to 27, to the time delay units 29 and 30, and to the distributor 15. A code is read from the tape by the tape reader 14 each time the tape reader is energized by the distributor 15, except when a no-readout signal is supplied from the distributor 15 to the tape reader 14. It will be seen that the distributor 15 also accepts inputs from the tape reader 14, the decoder 17, the time storage comparator 31, the timer 16 and feeds outputs to the tape reader 14, the time storage comparator 31 and the automatic gain control 28. For purposes of clarity, all outputs from the decoder 17 have not been shown. Start signals to tape reproducers 18, 19 and 27 have been shown on the block diagram of FIG. 1 and start connections are similarly made from the decoder 17 to the other tape reproducers 19 to 25.

The requirements of the tape machines 18–25 are of interest. They must start on a voltage pulse and run until stopped by a signal on the tape when the programme material is finished. When one of the magnetic tape reproducers 18–25 stops it must send out a voltage pulse to trigger the automatic gain control (AGC) 28. The AGC 28 must be capable of operating from any of three positions: (a) to turn the gain from full "on" to "off"; (b) to turn the music gain to an intermediate level from full "on"; and (c) to turn the music to full "on" from either of the foregoing levels.

Because the music fades take time, there must be time delays to synchronize the music functions and the insert tape machines. The music machine audio circuits must go through the AGC unit 28 and afterwards get mixed with the audio from all the other machines. The music machines must be interconnected so that when one stops, the next starts.

The operation of the equipment shown in FIG. 1 will now be explained with relation to a simple programme. Assume that automatic programming is to start at 1:03 a.m. after a live news programme and assume that the automatic programming is continued to 6:00 a.m. As has been previously mentioned the music reproduced by tape reproducers 26 and 27 is continuously available and is only decreased in level or made inaudible for the inserts which are made with other programme elements from the tape reproducers 18 to 25. The pattern of a typical hour of operation is shown in Table I. It might be assumed that all subsequent hours of programming would be a repetition of this programme.

TABLE I

| | |
|---|---|
| 00.00: | News (approximately 3 minutes) |
| 10.00: | Time announcement |
| 15.00: | Weather and sports (approximately 1 min.) |
| 20.00: | Time announcement |
| 25.00. | Time announcement |
| 30.00: | News (approximately 1 minute) |
| 35.00: | Time announcement |
| 40.00: | Time announcement |
| 45.00: | Weather and sports |
| 50.00: | Time announcement |
| 55.00: | Time announcement |

The recording of these programme elements on the several magnetic tapes, or other media used for recording the programme material, may be done in a very simple fashion. The time announcements are the same each night so only one time recording need be made with appropriate announcements recorded in sequence. The news, weather and sports can all be on another magnetic tape and recorded in sequence so with two music tapes, only four machines are required. A new news tape is required each night, naturally, and the music may be changed each week. The programming is quite satisfactory for automatic operation and for this time period.

FIG. 3 is a simplified block diagram of the operational mode that may be used for all-night programming in the pattern of Table I. In FIG. 3, the distributor has been removed from the circuit, showing the direct connections from the timer 16 to the tape reader 14 and of the reproducer stop pulses to the automatic gain control 28. For the sake of clarity, audio outputs from the tape reproducers 18 to 25 and from the automatic gain control 28 have not been shown in the block diagram of FIG. 3. Similarly, FIGS. 5 and 7 do not show audio signal paths but only switching or control signal paths. A series of pulses, six seconds apart and about 100 milliseconds long from the timer 16 trigger the paper tape reader 14. Each time the reader 14 receives a pulse it reads a code and advances the tape to the next position. When a code (punched digit) is read, pulses are sent on to close relays in the decoder 17 (assuming no error code is punched). With the equipment as shown in FIG. 3, a decoder output pulse can do one of thirteen things: (a) start magnetic tape machines 18–27; (b) turn the music up, off, or to intermediate level as background (BG).

To follow the system operation, assume a status and perform some function. Assume the music is playing at full level and a correct time announcement is to be inserted over a musical background. First, the reader would have to read a "Music BG" code. When this happens a pulse is sent to the time delay unit 29. The time delay is required because the reader cannot read another code (the one to start the tape machine with the appropriate announcement on it) for at least six seconds (when the reader is triggered again). A fade taking six seconds is much too long, so a time delay of about five seconds is provided by the time delay unit 29.

Six seconds after it reads the Music BG code and one second after the music starts to fade, the reader 14 is triggered by a timing pulse and reads a code to start tape machine 18 (the one with the announcement). From now on the reader requires no other code to complete the insert because the time tape will roll and music stay background until the end of the announcement when the audio tape machine 18 with the time announcements senses the stop signal on the tape, for example a metal tab, stops itself, and sends a pulse back, which triggers the auto gain unit 28. The automatic gain control 28 runs the music level back to full up.

All this time the tape reader 14 is advancing the tape every six seconds. Assume the next insert is a news broadcast. At the proper time, the first code to be read will be a Music Off code which will start the other time delay unit 30. A different delay time for Music Off is used because the gain control 29 has further to go so must start earlier. The delay here is about 4½ seconds. Six seconds after it reads the music off pulse and 1½ seconds after the music started to fade, the reader 14 is triggered and reads again. This time the decoder 17 starts tape reproducer 19, the one with the news. From here, the operation is identical with the previous example.

Triggering the reader accurately every six seconds has several advantages. It means that the reader will be triggered ten times per minute. This, in turn, means that since the punched tape is normally transported $\frac{1}{10}$ in. per digit in most available paper tape apparatus, 1 in. of punched tape is scanned each minute, or 5 ft. per hour. Both are convenient figures to work with.

If the timing pulses are accurate, the exact time any particular digit will be read can be predicted since the reader can be started on a specific digit at a specific time. Knowing this, a numbering stamp may be used along the tape showing the time each digit will be read. It is a simple matter then to punch the tape and know exactly the time each taped insert will be played. For the first time, when the announcer says "12.45" it actually is 12.45.

FIG. 4 shows a section of tape containing coded instructions for a sequence of synchronous programme elements such as the pattern of Table I. The sequence is shown as consisting of 50 digits which indicates that the elapsed time for the sequence is five minutes. If we know the time the first tape started, we automatically know when the second will start. This mode of operation is referred to as the "on time" mode where things start on time with a minimum of equipment in use. A synchronous motor, of the type used in tape recorders may be used to drive cams to provide the timing pulses.

The "on time" mode of operation has a serious and obvious drawback; it is the insertion of programme elements of unknown length using different tape machines. It may be desirable for example, to add commercials to a few newscasts during the night. Using the "on time" mode, this presents a real problem. If things are to start only on time pulses, it is essential to known the exact duration of every insert, and these inserts have to be multiples of six seconds in length, or all of the inserts (news and associated commercials) would have to be recorded on one tape and be less than five minutes long. This is difficult since newscasts are recorded at the last possible moment to keep them topical. Anything which complicates this recording will be detrimental to news coverage. Also, if two tapes are included in a single insertion, means must be provided to prevent the first insert running the music up when it stops.

If an insert uses three tape reproducers it opens up a whole new set of problems.

The equipment of the present invention is capable of another mode of operation. This may be called a "feedback" system, but is usually called the "off time" mode.

To implement this second mode of operation, a code element is provided called the "off time" code. When this code is punched in the tape and read in the reader, the equipment is connected as shown in FIG. 5, the necessary connections being made by the distributor 15. In this mode, the reader 14 is no longer triggered by timing pulses but by stop pulses from the tape machines 18–25. This means that each time a tape machine (18–25) stops, the reader 14 is triggered and it will read the next code. This code can start another tape machine and the sequence of operation of tape machines can be random and last for any length of time. The auto-gain control 28 is not affected by the audio tape stop pulses since these pulses are not fed to the auto gain control 28 by the distributor 15 during the off-time mode of operation. This mode of operation is common in commercial systems but despite its many attractions, it is asynchronous and prevents accurate programming. However, this mode of operation can be used in the system of the present invention when required. When it is desired to revert to the "on time" mode it is necessary to punch and read an "on time" code on the tape and the equipment will reconnect into the "on time" mode.

FIG. 6 on its right hand side, shows a sequence of codes which may be used for some time periods. A series of eight codes using eight consecutive digits gets the equipment "off time," turns the music off, starts a tape with a time announcement, then a commercial, then news, another commercial, music up full, and back on the "on time" mode.

During the "off time" sequence, however, the "time" sense of the punched tape is lost because the reader 14 is not triggered by timing pulses, and the punched tape is not transported every six seconds. The digits on the tape are no longer in step with the clock. The "on time" code, however, triggers a series of events that puts the tape back "on time," with the position of the tape back in step with the clock. If, as shown in FIG. 6, 50 digits later a time announcement is to occur, it must happen in five minutes from the start of the previous time announcement. (Assuming, of course, that the insert is less than five minutes.)

FIG. 7 illustrates the system that brings the paper tape back "on time" with the timer. The relay 40 is the transfer relay in the distributor 15 and is drawn in the "on time" mode position. Note that the timing pulses from the timer 16 are connected to the reader 14 and the audio tape stop pulses from tape reproducers 18 to 25 are connected to the automatic gain control 28. This is the "on time" mode and the equipment will remain wired like this until an insert comes along requiring the use of two or more tape machines. When this happens the "off time" code energizes the relay and the following connections are made by the distributor:

(a) The triggering, or advancing, of the reader 14 is transferred from the timing pulses from the timer 16 to stop pulses.

(b) The stop pulses from the reproducers 18 to 25 are removed from the automatic gain control 28.

(c) The timing pulses from the timer 16 drive a 102 point stepping switch 41 in the time storage comparator 31.

(d) The reader 14 drives a second 102 point stepping switch 42 in the time storage comparator 31 via a cam in the reader 14 that pulses each time the reader 14 reads a digit.

The system stays in this mode as long as the sequence of tape machines requires (perhaps several minutes). All this time, the stepping switch 41 is triggered by the timing pulses. Its position counts the number of digits the reader 14 should have advanced if the reader 14 had been triggered by timing pulses during this time. Each time the reader 14 is triggered, it, in turn, drives the stepping switch 42. The position of this stepping switch keeps track of the number of digits read by the reader 14 in the off-time mode. When the tape insert sequence stops and the music comes up, the "on time" code is read by the reader 14, and the reader 14 reads at a high rate. As the reader 14 reads it continues driving the stepping switch 42 one step per digit read. When the number of digits read by the reader 14, as indicated by the position of the stepping switch 42, agrees with the number of digits which should have been read in the on-time mode, as shown by the position of the stepping switch 41, a pulse is generated that de-energizes the transfer relay 40 and puts the system back onto the "on time" mode. At this time, the digits on the reader are back in step with the clock, the reader is back on timing pulses and the tape-off pulses are back on the automatic gain control. The next insert will occur on time.

It will be apparent to those skilled in the art that numerous alternations can be made in the systems as disclosed in this application and, accordingly, applicant does not wish to be limited to the specific embodiment disclosed. For example, numerous types of switching devices are currently available and could be substituted for any specific switches or relays which are shown in the disclosure. Similarly, numerous sources of recorded programme material are also available, and the magnetic tape machines used in the embodiments of the disclosure are merely illustrative of such sources of recorded programme material. Also, the coded signals for controlling the sources of recorded programme material could be stored either on punched paper tape as shown, or on any other suitable storage media such as punch cards, photographic film, or magnetic tape.

I claim:

1. Apparatus for automatically controlling the programme of a radio station comprising a record containing a sequence of coded instructions and adapted to be advanced and read by a reader operated either in synchronism with a timer, or by signals from sources of programme material, means for decoding said coded elements to control the operation of a plurality of sources of programme material, at least one of said sources of programme material containing programme elements of indeterminate length, said decoded instructions being adapted to control the operation of said sources of programme material, each of said sources being adapted to generate a stop signal on reaching the end of a programme element, a time storage comparator adapted to accept input pulses from said timer and from said reader and to store the number of pulses by which the scanning of said record deviates from synchronism with said timer, and means for advancing said reader at a high rate without decoding said coded elements to return said record to synchronism with said timing device.

2. Apparatus according to claim 1 wherein said record comprises a paper tape having a plurality of holes punched therein, said holes forming said coded instructions, said paper tape being adapted to be advanced at a predetermined rate through said reader to maintain the sequence of programme elements in synchronism with a timing device, said tape reader being adapted to advance the paper tape and to be energized either by said timer or by pulses from said sources of programme material.

3. Apparatus according to claim 1 wherein said sources of programme material are magnetic tape recorders and wherein one of said sources contains music, said source containing music being adapted for continuous operation and being provided with means for varying the amplitude of the signal from said music source to permit the simultaneous transmission of other programme elements.

4. A system for automatically operating a radio station adapted to control the sequence of reproduction of recorded programme elements, one or more of said programme elements being of unknown length, comprising a record containing a sequence of coded instructions, apparatus responsive to said coded instructions to initiate and terminate selected programme elements, timing means adapted for synchronizing reading of said coded record with a predetermined time sequence, means for storing a quantity indicative of the length of a programme element and for advancing said record in accordance with the length of said programme element whereby the synchronous operation of said system is maintained.

5. A system according to claim 4 wherein said programme elements are recorded on a plurality of reproducible records, each record being adapted for independent reproduction.

6. A system according to claim 4 wherein one of said programme elements comprises music, the reproducers of said music being continuously operated and variable gain means is provided for varying the level of said music.

7. A system according to claim 4 wherein said record of coded elements comprises a paper tape having a plurality of perforated codes made therein, each perforated code constituting an instruction for altering one of said programme elements.

8. A system according to claim 7 wherein said paper tape is perforated with ten coded instructions per inch, said timer being adapted to provide timing pulses initiating scanning of said paper tape once each six seconds whereby one inch of said paper tape corresponds to an elapsed time of one minute.

9. Apparatus according to claim 2 wherein said sources of program material are magnetic tape recorders and wherein one of said sources contains music, said source containing music being adapted for continuous operation and being provided with means for varying the amplitude of the signal from said music source to permit the simultaneous transmission of other program elements.

References Cited by the Examiner

UNITED STATES PATENTS

| | | | |
|---|---|---|---|
| 2,969,427 | 1/1961 | See | 340—147 |
| 2,995,630 | 8/1961 | Kabrick et al. | 179—100.1 |

BERNARD KONICK, *Primary Examiner.*

A. BERNARD, *Assistant Examiner.*